T. L. JOHNSON, DEC'D.
M. J. JOHNSON, ADMINISTRATRIX.
HIGH SPEED RAILWAY.
APPLICATION FILED APR. 6, 1906. RENEWED NOV. 12, 1908.

1,090,213.

Patented Mar. 17, 1914.
9 SHEETS—SHEET 7.

T. L. JOHNSON, DEC'D.
M. J. JOHNSON, ADMINISTRATRIX.
HIGH SPEED RAILWAY.
APPLICATION FILED APR. 6, 1906. RENEWED NOV. 12, 1908.

1,090,213.

Patented Mar. 17, 1914.

UNITED STATES PATENT OFFICE.

TOM L. JOHNSON, OF CLEVELAND, OHIO; MARGARET J. JOHNSON ADMINISTRATRIX OF SAID TOM L. JOHNSON, DECEASED.

HIGH-SPEED RAILWAY.

1,090,213.      Specification of Letters Patent.      Patented Mar. 17, 1914.

Application filed April 6, 1906. Serial No. 310,335. Renewed November 12, 1908. Serial No. 462,241.

*To all whom it may concern:*

Be it known that I, TOM L. JOHNSON, a citizen of the United States, residing at Cleveland, in the county of Cuyahoga and State of Ohio, have invented a certain new and useful Improvement in High-Speed Railways, of which the following is a full, clear, and exact description.

The object of the present invention is to provide a high speed railway in which the various parts of the installation are possessed of the characteristics necessary to insure successful operation.

In the attainment of high speeds it has been found that, independently of the capacity of the motor for developing the speed sought, there are limiting factors introduced by the centrifugal strains on the rotating parts and by the friction generated by the surfaces of the moving parts of the motor and the vehicle. The friction arising from the moving parts of the motor and the power transmitting apparatus may be generally classed as internal friction. That friction developed between the vehicle and its support, the track, may be called external.

One of the features of my invention is an arrangement whereby the vehicle is caused to advance without material friction at any point. In the development of this feature, I have produced a system in which the carrying trucks have shoes which bear, when at rest, directly upon a guiding track but which have, during movement of the car, no considerable frictional contact with the said guiding track, since the whole or any desired portion of the weight of the car will be magnetically sustained with absence of external friction, through the novel mechanism which I have devised. Further, the motive means which I employ, is electric, and in the form illustrated, comprises a magnetic field maintained between the fixed track-way and the movable vehicle, and means for passing an electric current through the field in such manner as to distort the same and produce a traveling motion on the part of the vehicle. The distortion of the field and the consequent traveling motion is obtained without the utilization of a motor having movable parts; thus, during the travel of the vehicle, it will be free from internal friction and also from strain arising from rotating or reciprocating parts. Inasmuch, therefore, as I have thus been able to eliminate both external and internal friction, centrifugal strain and reciprocative movement from my motive system, it will be readily comprehended by engineers, and others, skilled in the art, that a practically unlimited speed may be attained.

Many improvements in details are associated with the above mentioned features, as will appear more fully below.

The trackway is, in the form here illustrated, of the overhead type, although it may obviously be of any type, and it is carried on channel beam standards A having supporting brackets A' projecting therefrom to allow clearance for moving cars or vehicles. Inasmuch as the rails A² have the function of guides for the truck shoes I use a construction in which there are upper, lower and side walls or surfaces for limiting the movement of the trucks. These guides are thus troughlike in their form and may have therein something for the purpose of reducing the friction whenever the truck shoes bear thereon.

Extending across the trackway and carried by the opposite parallel girders A³ is the top plate B which is of suitable material and construction for conducting magnetic flux. The said top plate is properly constructed to withstand the strain brought thereon when the weight of the car is magnetically supported thereby, after the manner below described, and it will of course be evident that many structural designs, other than the single form shown herewith, may be adopted. This plate is channeled at each side on its lower face to receive the electric current feeds and other necessary parts to be subsequently described, and has, by virtue of the two parallel channels, B' B², a central longitudinal rib B³ projecting downwardly and also a downwardly projecting rib B⁴ along each outer edge.

Figure 8:
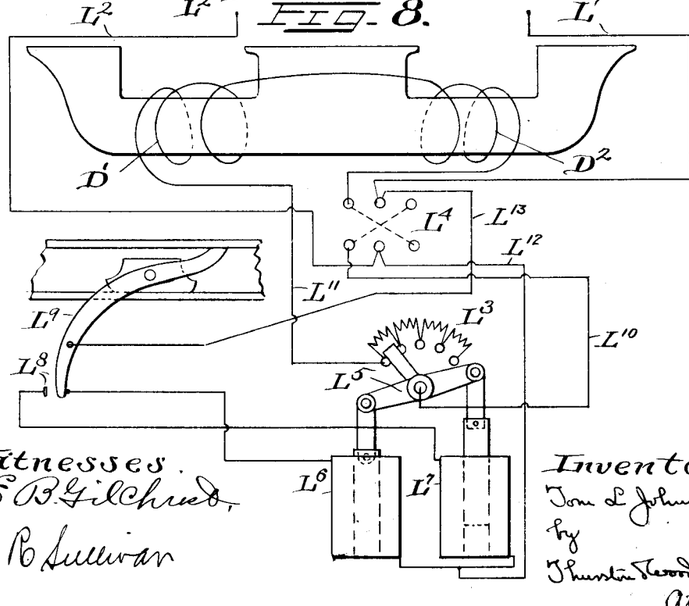
Fig. 8 is a diagram illustrating the winding of the motor magnet and the system whereby the flow through the coils may be automatically regulated to produce the desired amount of flotation.

The truck C which carries the car is supported, when at rest, by properly shaped shoes C' C² inclosed in the guide rails. These shoes are of such dimensions that sufficient play may be had to permit of turning of curves and the lifting of the truck so that no vertical pressure shall be borne by the rail. The truck body is, like the top plate, so constructed and of such material as to be magnetically conductive, and is, also like the top plate, channeled on each side but on its upper face, forming a central rib C⁵ and side ribs C⁶ C⁶ which approach face to face the ribs B³ B⁴ B⁴ of the top plate and are in proximity thereto when the truck is on the trackway. The channels C³ C⁴ thus produced are for the purpose of receiving horizontal coils D' D² and also the brush mechanism of the split solenoid to be described below. These coils, which are oppositely wound, see diagram in Fig. 8, are for the purpose of causing a vertical magnetic flow which passes from the central rib C⁵ on the truck body, into the central rib B³ depending from the top plate, down from the outer ribs B⁴ B⁴ on the top plate into the outer ribs C⁶ C⁶ on the truck body, or in the reverse direction. The important point is that vertically disposed magnetic lines of force are obtained by this arrangement, and a lifting force will exist tending to elevate the truck so that its body will approach the top plate and lift the shoes C' C' from the track and reduce the friction during travel after a manner and under a control subsequently to be described.

The channels on the lower face of the top plate receive the electric current feeds E' E² and the contact strips by which the current is passed through a longitudinally split solenoid, the wires for the upper half of which solenoid are fixed to the top plate, while the wires for the lower half are fixed to the truck and connection between the two halves of the solenoid obtained by brushes on the truck traveling along the contact strips aforesaid.

Figure 9:
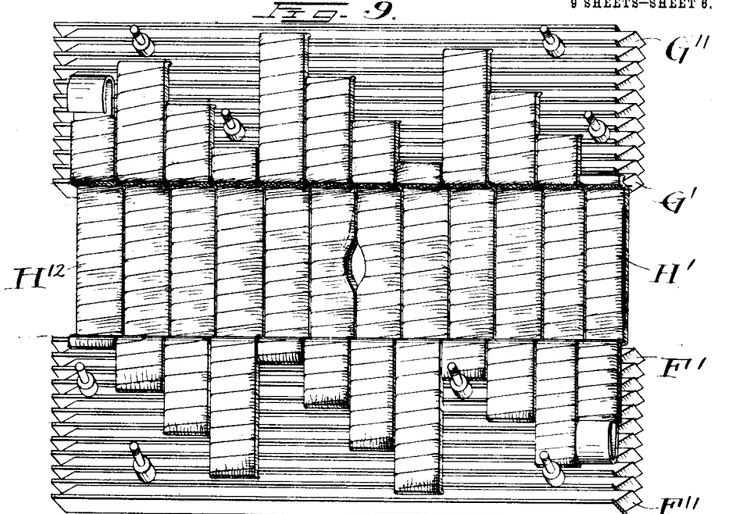
Fig. 9 is a perspective view taken from the upper face of one of the sections which are made up of the aforesaid strips and ribbons and are fixed along the trackway.
Figure 10:
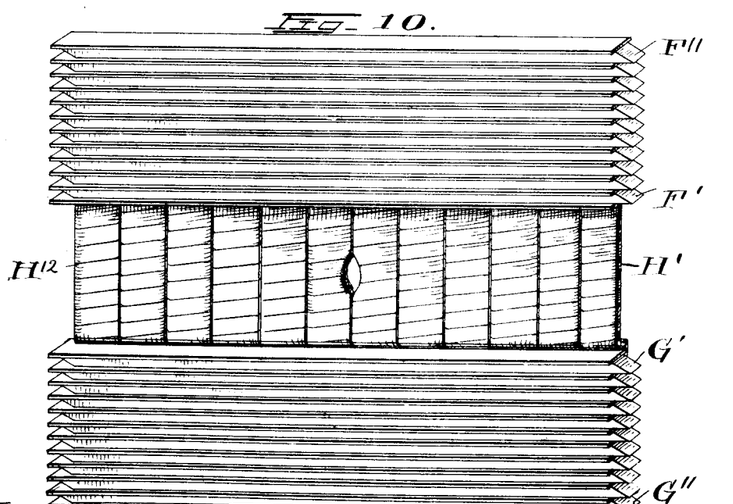
Fig. 10 is a perspective view taken from beneath, of one of the same sections.

By reference to Figs. 2, 4, 5, 9 and 10 it will be noted that the contact strips are in short lengths, made up into groups or sections as shown in Figs. 9 and 10 and are separated by intervening insulation. They are held together by any suitable means such as a transversely extending insulated bolt, the groups or sections themselves being suspended from the top plate in the parallel channels by insulated hangers. In the construction illustrated I have placed eleven strips of each group in one channel. To the strips in channel B' I have applied the reference letters F' F² F³ F⁴ F⁵ F⁶ F⁷ F⁸ F⁹ F¹⁰ F¹¹ and to those in channel B² I have applied the reference letters G' G² G³ G⁴ G⁵ G⁶ G⁷ G⁸ G⁹ G¹⁰ G¹¹. Connected with and extending crosswise from each contact strip but one, is a copper ribbon H' H² H³, etc., which is connected at its other end to another strip in a group in the opposite parallel channel.

A similar connection is made from each one of the feed wires E' E² to one of the strips, making twelve cross ribbons in each group. These wire connections, which are here shown in the form of broad flat, insulated, ribbons, are so arranged that the feeder E' or E² in each channel is connected with the innermost strip G' or F' in the opposite channel. The outermost strip F¹¹ or G¹¹ in each channel is likewise connected with the next to the innermost strip G² or F² in the parallel channel, and the other connections are similar.

The truck body carries, similarly to the top plate, a series of insulated crosswise conducting ribbons I' I², etc., which extend from one to the other of the channels in the upper face of the truck, and which are connected at each end with brushes K' K² K³ etc., designed to ride against the contact strips to which the crosswise ribbons in the top plate are connected.

Figure 1:
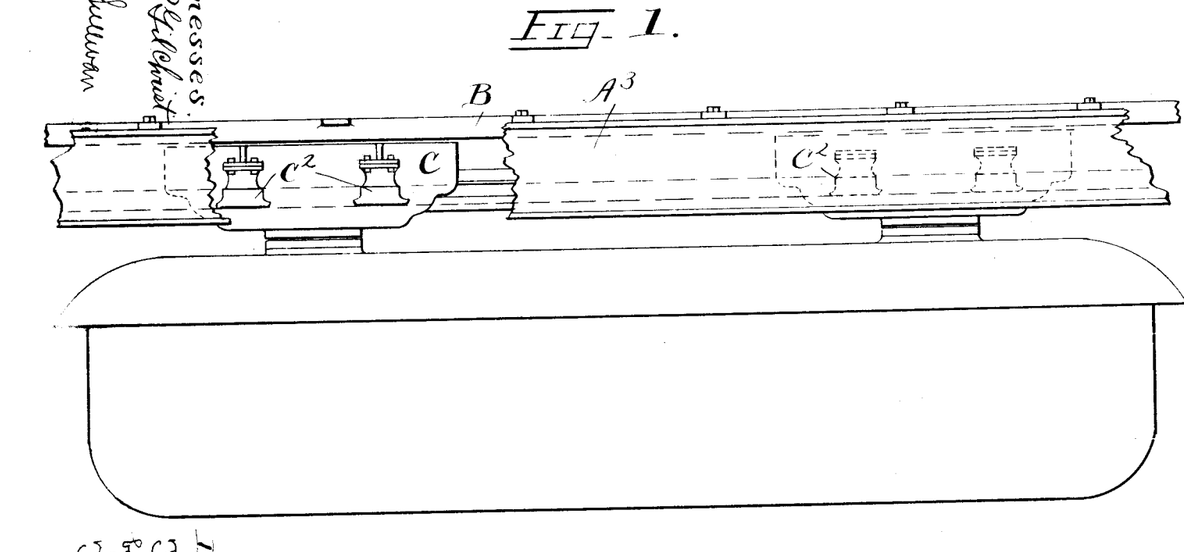
Figure 1 is a side elevation partly broken away, showing a carriage and the manner of mounting the trucks therefor upon the trackway.
Figure 2:
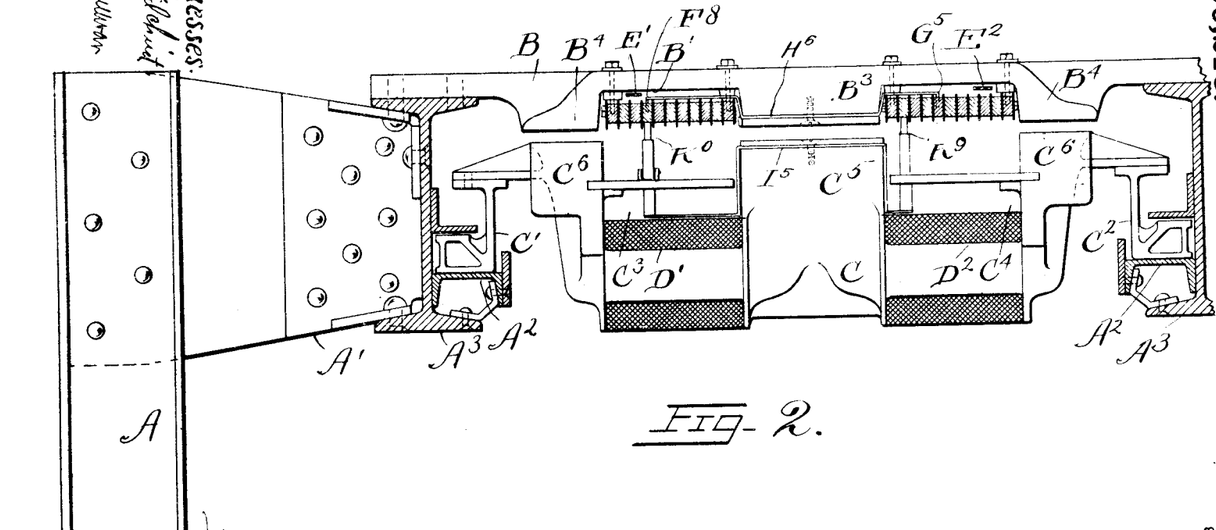
Fig. 2 is an end elevation, with certain parts omitted, of one of the trucks, showing it in position on the trackway which is partly in section and partly broken away.
Figure 3:
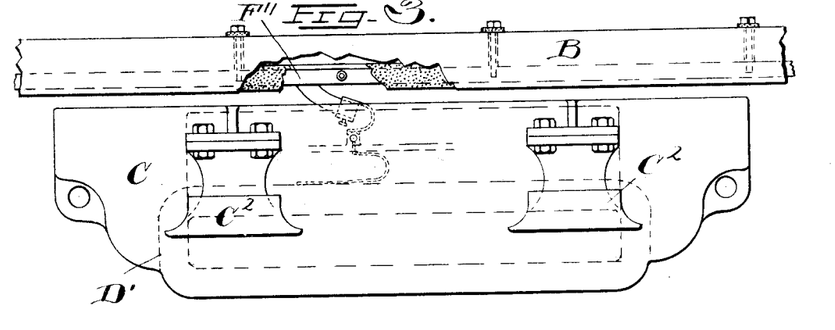
Fig. 3 is a side elevation of a truck showing part of the overhead plate of the trackway thereover which latter is broken to show the structure of the short, longitudinal, contact strips.
Figure 4:
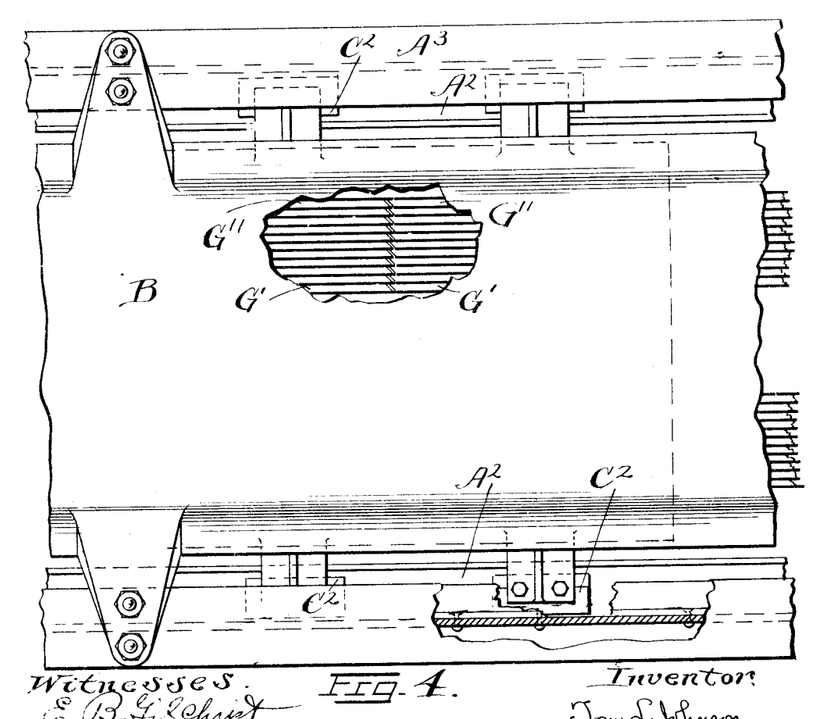
Fig. 4 is a top plan partly broken away showing the same parts as in Fig. 3.
Figures 5, 6:
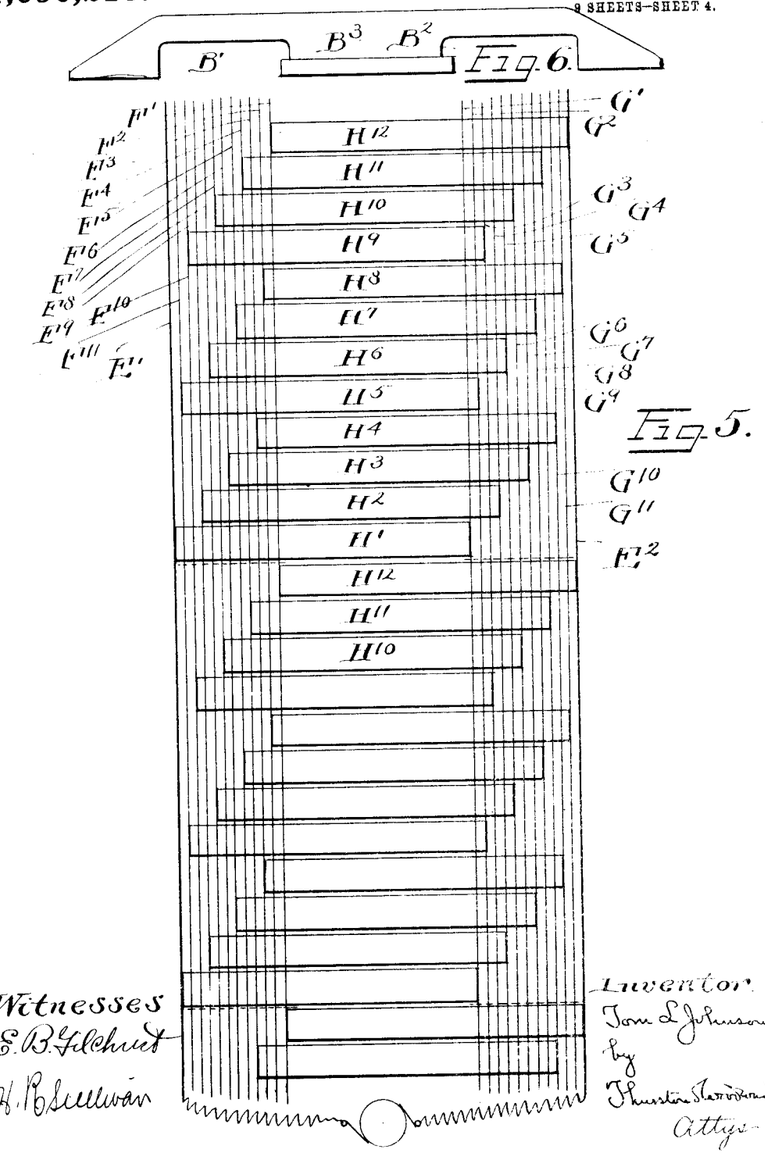
Fig. 5 is a diagram showing connections between the feeds, contact strips and crosswise ribbons along the trackway.
Fig. 6 is an end view of the overhead plate, which carries the current feeds, contact strips and ribbons.
Figure 7:
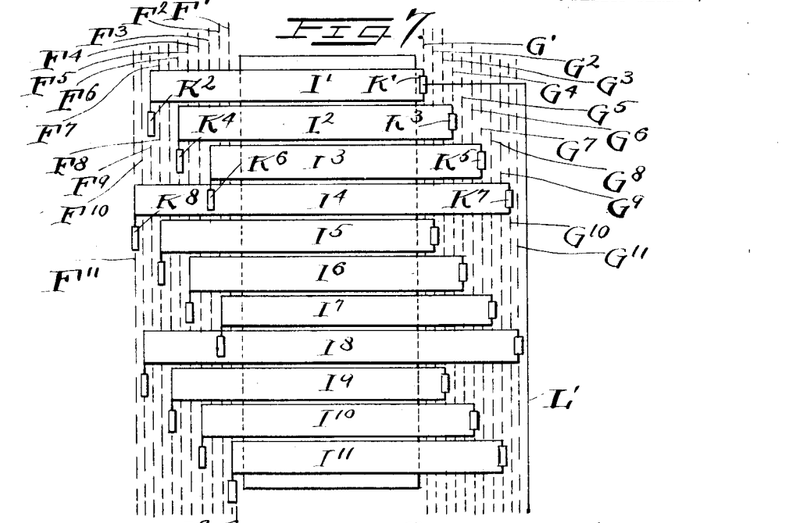
Fig. 7 is a diagram showing the arrangement of the crosswise ribbons on the motor truck, their brushes, and the shunt leads to the motor magnet.

By reference particularly to Figs. 5 and 7, it will be seen that the brushes and other parts are so disposed that current passes back and forth alternately through the ribbons of the truck, and the ribbons of the trackway or track. For a complete understanding of this important part of my invention, a detailed description of the circuits is given below.

Let it be assumed that the feed conductor E' is positive and that the feed conductor E² is negative, and let it be assumed that the conductors I' to I¹¹ of the truck are beneath the conductors H¹² to H' on the lower half of Fig. 5. (The last nine of these conductors are not designated, but it will be understood that they are the conductors which might be designated H⁹ to H' respectively). Current will now pass from feed conductor E' to the right along the upper conductor H' to contact strip G'; thence down through the contact brush K'; thence to the left along the lower conductor I' to brush K²; thence to the upper contact strip F⁹; thence to the left by the upper cross conductor H² to contact strip G⁴; thence down through the brush K³; thence to the left along lower cross conductor I² to brush K⁴; thence up to contact strip F⁶; thence across the upper cross conductor H³ to strip G⁷; thence down through brush K⁵; thence to the ⁱt along the lower cross conductor I³ to brush K⁶; thence up to contact strip F³; thence to the right along the upper cross conductor H⁴ to contact strip C¹⁰; thence down through brush K⁷; thence to the left along the lower contact strip I⁴ to brush K⁸; thence up to contact strip F¹¹; thence to the right across upper cross conductor H⁵ to contact strip G²; thence down through brush K⁹; thence to the left along I⁵, up through brush K¹⁰ to strip F⁸; thence along the upper cross conductor H⁶ to contact strip G⁵; thence down through brush K¹¹; thence to the left along lower cross conductor I⁶; thence up through brush K¹² to contact strip F⁵; thence through upper cross conductor H⁷ to contact strip G⁸, etc., across to the right, through the remaining cross conductors H⁹ to H¹² and to the left along the lower cross conductors I⁷ to I¹¹, until finally cross conductor H¹² is reached, which extends to the negative feed conductor E², and which completes the circuit through the split solenoid. Assuming that the truck is moving along Fig. 5, toward the top of the sheet, then when the leading brush K' passes beyond H¹² near the middle of Fig. 5, until it is nearly opposite H', the current from the feed wire E' instead of passing to the contact strip G' by the lower cross conductor H' of Fig. 5, now passes to this contact strip by the upper or next succeeding cross conductor H' and the lower cross conductor H' is cut out of circuit. The circuit may now be traced as follows: From the feed wire E' through the conductor H' near the middle of Fig. 5 to the right, to the contact strip G'; thence down through contact brush K', thence to the left along lower cross conductor I' to brush K², thence up brush K² to contact strip F⁹; thence as before across upper cross conductor H² (near the bottom of the sheet); thence down through the brush K³; thence to the left along the lower cross conductor I²; thence up contact brush K⁴ to contact strip F⁶; thence to the right through the upper cross conductor H³, etc., until conductor H¹² is reached, and the circuit is again completed. Now, assuming that the leading brush K' comes nearly opposite the contact strip H², near the middle of Fig. 5; thence the upper cross conductor H² will be cut into circuit and the lower cross conductor H² will be cut out of circuit. This same action takes place continuously as the truck moves along the stationary element or trackway.

The arrangement of the upper and lower crosswise ribbons and their brushes is such that a split solenoid is produced, through which and along the exterior of which a magnetic flux will flow when a current is passed. The lines of magnetic flow through and along the outside or this solenoid will, of course, be essentially horizontal and longitudinal in direction, with reference to the truck body, and therefore through and transverse the previously mentioned vertical flow between the central ribs of the truck and top plate. Obviously, the result of such a condition will be a distortion of the vertical lines of force opposed by a tendency upon their part to straighten and shorten their path, but inasmuch as the top rib is fixed to the trackway and the bottom rib is fixed to the movable truck, the net result is a movement of the truck.

Figure 11:
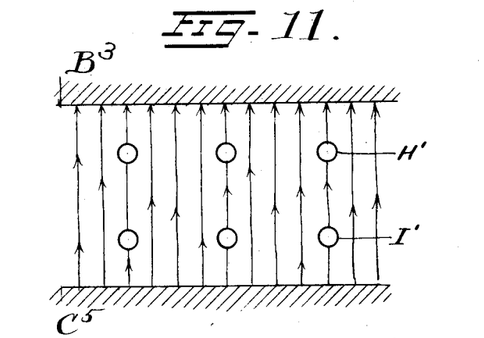
Figs. 11, 12, 13, 14, 15 and 16 are diagrams explanatory of the movement of the car through distortion of the magnetic field.
Figure 12:
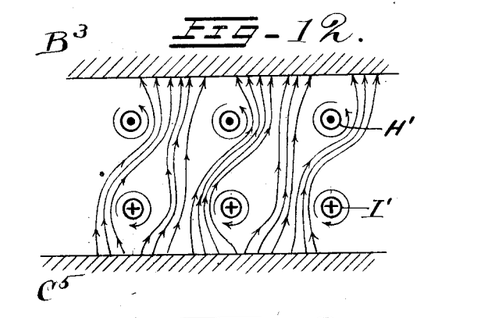

By reversing the switch which controls the direction of the current through the truck coils the direction of the magnetic flow between the central ribs of the truck and the top plate will of course be reversed. Such a reversal, or a reversal in the direction of current through the split solenoid by any suitable means, is found to cause a reversal as to direction of the pull. The theory upon which this action may be explained will be clear by referring to the diagram shown in Figs. 11, 12 and 13. In these diagrams a few of the crosswise ribbons which compose the split solenoid, are indicated by ordinary circles and shown as, somewhat spaced apart. The magnetic flow between the central ribs of the truck and top plate are indicated by more or less vertical lines having arrow points thereon. The direction of current flow through the upper and lower wires of the solenoid and the circular magnetic field created about such wires are indicated in the conventional manner in Figs. 12 and 13. In Fig. 11, the magnetic lines are supposed to flow upward from the lower rib and are shown in their normal location pursuing the shortest path in a straight line. In this diagram, no current is flowing through the upper cross conductors H' to H¹², and the lower cross conductors I' to I¹¹ which make up the solenoid. In Fig. 12, the flow of the current through the solenoid winding is indicated as being away from the observer in the lower wires and toward the observer in the upper wires. This induces circular magnetic fields having the direction indicated by the circular arrows about the wires. The vertical flux still being in the same direction as in Fig. 11, will attempt to pass through the fields created by the solenoid windings, but these fields will have the effect, due to their individual direction, of crowding and distorting the vertical lines after the manner indicated.

Figure 13:
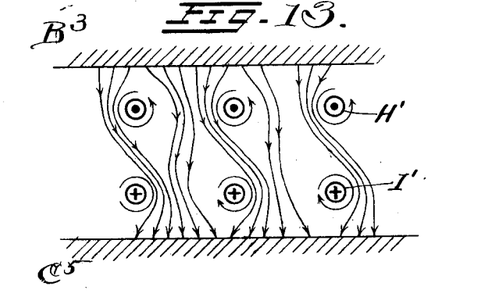
Figure 14:
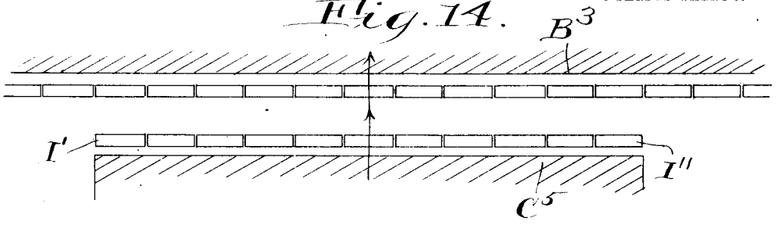
Figure 15:
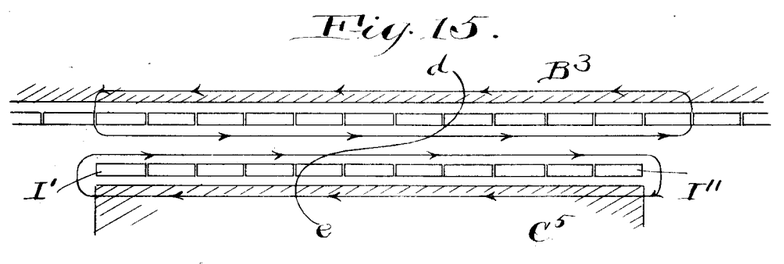
Figure 16:
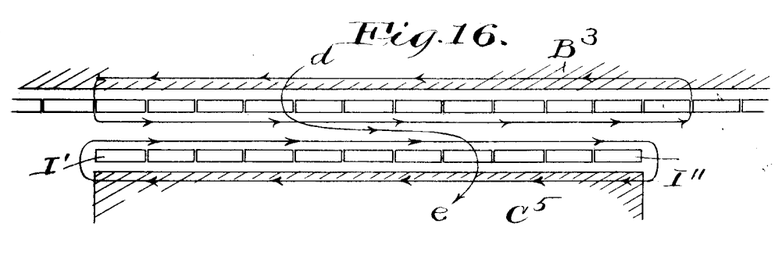

Inasmuch as the tendency of all lines of force is to pass in the straightest possible path, there will obviously exist a tension between the upper and lower poles or ribs, one of which is, in the present construction, movable. The result of such a condition is that the movable rib and the structure attached thereto, advances toward the right in this figure. If now, the direction of flow on the part of the vertical lines of force be reversed, and the current through the solenoid wires maintained, the distortion of the vertical lines will be as indicated in Fig. 13, with the result that the lower or movable rib fixed to the truck body will move toward the left. Thus, it will be seen that, as long as the vertically disposed magnetic flow exists and as long as a current through the solenoid wires is maintained, a movement of the truck in one direction or the other will continue. In point of fact, however, the wires composing the solenoid are made in the form broad, flat ribbons, which are so closely placed, side by side, that the individual magnetic fields induced, merge, as in the case of all solenoids, with the result that a continuous flow through the solenoid and along the exterior thereof will be induced somewhat as diagrammatically indicated in Figs. 15 and 16. The effect of this induced field will, as a whole, be similar to that obtained by the individual wires shown in diagrams of Figs. 12 and 13. For example, the mean path of the vertical lines of force may be regarded as indicated by the line a—b in Fig. 14 when there is no current passing through the solenoid. Distortion of this mean path may be regarded as indicated by the line d—e in Fig. 15 when a current passes through the solenoid in such wise as to induce the horizontal magnetic field to have the direction of flow indicated by the arrows. It will of course be understood that when the direction of either the vertical magnetic field or the horizontal flow is reversed, the distortion of the vertical field is also reversed, as indicated by the line d—e representing the mean path in Fig. 16. Thus, I am enabled not only to lift the truck off of the track rails, by means of the magnetic field created by the coils about the truck body but by continuous distortion of the field to secure progressive movement.

Figure 17:
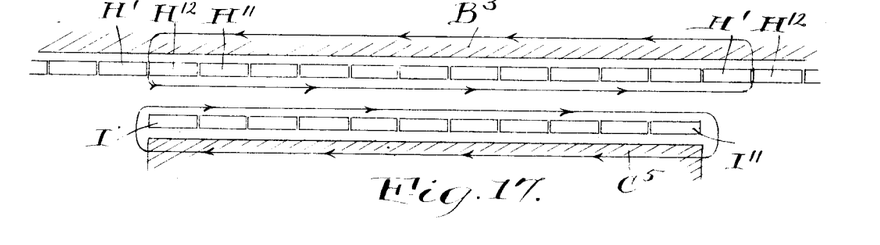
Figs. 17, 18 and 19 are diagrams explanatory of the action of the split solenoid, composed of the crosswise ribbons on the motor truck and overhead ribbons connected therewith, in assisting in the movement of the car.
Figure 18:
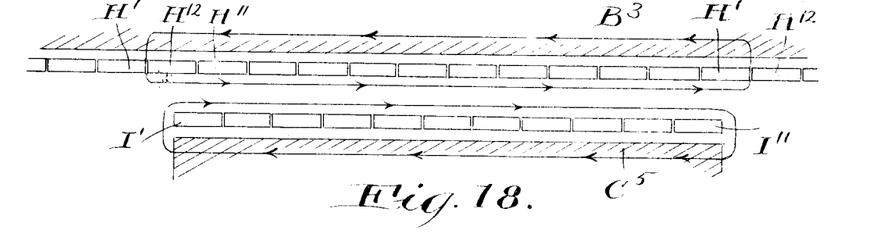
Figure 19:
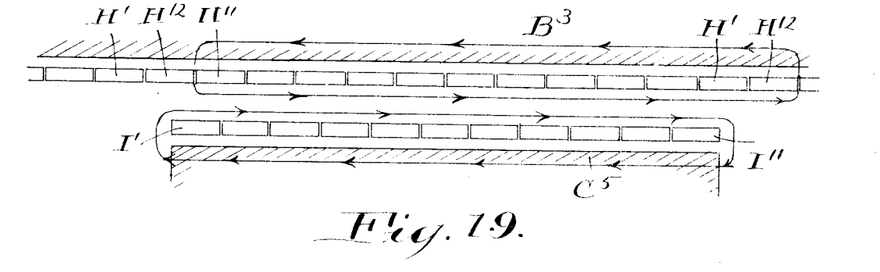

It is to be noted that while the above description sets forth the principle of operation of the motor through distortion of the vertical magnetic field created by the coils about the truck body, there is also a certain pulling effect obtained by means of the split solenoid alone, which is so overbalanced in construction as to assist in the movement of the truck independently of distortion of the magnetic field aforesaid. This may be understood by referring particularly to Figs. 17, 18 and 19. It being borne in mind that, owing to the disposition of brush connections, there will be a current passing through twelve of the overhead crosswise ribbons whenever it passes through the eleven crosswise ribbons on the truck, a condition of affairs illustrated in Fig. 17 will exist when the ribbons are directly in vertical alinement. The flow of the magnetic flux will be as indicated, around the eleven lower ribbons and around twelve upper ribbons, eleven of which are directly over the truck, the twelfth being in advance at that end toward which the brushes K² K⁴ K⁶ etc., on the left hand side of the diagram in Fig. 7, are advanced. These brushes may of course be mounted in any suitable manner to be capable of being swung so as to be in the lead in either direction with reference to the brushes K' K³ K⁵, etc. The opposite sides of the solenoid are thus unbalanced and since one part is movable there will be a tendency for the parts to assume the relation indicated in Fig. 18 wherein the balance between them is adjusted. But as soon as the truck bearing the lower part of the solenoid advances to such a position of apparent balance, the leading brush, moving therewith, will cut in the overhead ribbon immediately in advance of the group of twelve which previously constituted the upper part of the solenoid and the movement of the same brush will cut out the rearmost ribbon of said group, creating the condition indicated in Fig. 19. This condition is even more unbalanced than that previously described and the parts will be again pulled to occupy positions indicated by Figs. 17, 18 and 19 successively, the solenoid being continuously self-constructive as the lower part advances.

It is to be noted that while the solenoid is overbalanced in the present case by the difference between the number of upper and lower ribbons in action at one time, it may be over-balanced by other constructions even when the same number of ribbons are in simultaneous action above and below. For instance, the metal of the rib on the truck may be extended farther beyond the solenoid in one direction than in the other, thus decreasing the magnetic reluctance for the lines of force passing around that end and thereby creating the same unbalanced condition as above described, which the solenoid will continuously tend to rectify by movement in the proper direction. But this rectification will never be attained by reason of the fact that the movement of the lower section of the solenoid shifts the connections with the overhead ribbons in such manner as to continuously maintain the said unbalanced condition.

Thus it will be seen that I have successfully combined in one motor two different motive forces, each of which is attainable through the medium of the split solenoid, as described. Now the movement of the truck in no manner affects the continued existence of the split solenoid since the lower half, with its brushes, is movable with the truck and the upper half, with its contact rails, is practically continuous along the trackway. Therefore, movement of the truck will not destroy the solenoid, which will be continuously maintained by the formation of new connections between the lower and upper ribbons as fast as the old connections are broken.

By interposing controlling devices the strength of the vertical magnetic pull can be regulated, and in fact this is necessary in order to avoid pulling the truck up so that its shoes bear heavily against the upper guides of the trackway. Fig. 8 illustrates diagraphically how the vertical lift is automatically controlled.

As shown, shunt wires $L'$ $L^2$ take the current from the ends of that portion of the split solenoid carried by the truck and conduct it through a rheostat $L^3$ and reversing switch $L^4$ to the truck coils $D'$ $D^2$. I have attached an oscillating conducting arm $L^5$ to the rheostat, which arm is controlled by a couple of permanent solenoids $L^6$ $L^7$ connected in parallel with the shunt leads at the switch. Their connection is controlled at some point $L^8$ by a suitable mechanical device which is designed to throw the current through either solenoid in turn. In the form shown the mechanical device referred to consists of a pivoted arm $L^9$ insulated from, but secured to, the truck in some way so that, upon the truck shoes rising to upper side of the guide rail, the arm will be swung to make connection through that solenoid $L^7$ tending to operate the rheostat so that the resistance is increased. When the truck shoes drop, so as to rest upon the rail, connection through the first solenoid will be broken but established through the second solenoid, thereby operating the rheostat to cut out resistance. It will be plain that this arrangement will maintain the truck shoes out of permanent frictional contact with the upper or lower guides and the car will be drawn forward without hindrance.

The circuit of the coils $D'$, $D^2$ may be traced as follows: Assuming that $L'$ is the positive conductor and $L^2$ the negative, current will pass by way of the conductor $L'$ to the reversing switch and if the blades (not shown) of the reversing switch are thrown to the right so as to engage the pair of contacts to the right of the middle pair of contacts, thence the current will pass through the reversing switch and thence by way of conductor $L^{10}$ to the rheostat $L^3$. From the rheostat the current will pass by conductor $L^{11}$ to the coils $D'$ and $D^2$, and thence again to the reversing switch and to the conductor $L^2$. The solenoid coils $L^6$, $L^7$ are connected to the reversing switch in shunt to the coils $D'$, $D^2$ by conductors $L^{12}$ and $L^{13}$, connected, as shown, to the middle contacts of the reversing switch.

There may be many alterations in the details and relations of parts as here shown and described and I do not limit myself to such, since I desire to claim broadly the novel features which characterize my apparatus.

I claim—

1. In an electric traction system, a truck, a stationary element along which the truck is adapted to move and having a portion above the truck, and means for creating both a tractive and a lifting effect on the truck, comprising means for creating a magnetic field which passes between the stationary element and the truck, and means for distorting said field in the direction that the truck is adapted to move.

2. In an electric traction system a truck and a stationary element along which the truck is adapted to move and having a portion above the truck, means for creating both a lifting and a tractive effect on the truck, comprising means carried by the truck for establishing a magnetic field which passes between the truck and said stationary element, and means for distorting said magnetic field so as to cause the field to have both a vertical and a horizontal component.

3. An electric traction system comprising a stationary element and truck adapted to move along the stationary element and having a portion beneath the latter, means for creating both a lifting and a tractive effect on said truck, comprising a magnet carried by the truck for creating a magnetic field which passes between the truck and stationary element, and means for distorting the magnetic field in a horizontal direction thereby causing the pull of the magnet to have both a vertical component and a horizontal component.

4. In a traction system, a stationary element and a truck adapted to be moved along the same the truck having a part extending below the stationary element, means carried by the truck for creating a magnetic field which passes between the truck and stationary element and has a lifting effect on the truck, and means arranged partly on the truck and partly along the stationary element for distorting said magnetic field so that the pull of the magnetic field on the truck has a horizontal component and a tractive effect.

5. In a traction system, a stationary element and a truck adapted to move along the stationary element, the truck having a part below said element, means for creating a magnetic field which passes between the truck and stationary element and tends to lift the truck, additional means for causing said magnetic field to have a tractive or propelling effect on the truck comprising a solenoid winding carried partly by the truck and partly by the stationary element, the part carried by the truck coöperating with and completing the circuit through the part carried by the stationary element.

6. In a traction system, a stationary element and a truck adapted to move along the stationary element, said truck being located below a portion of the stationary element, means carried by the truck for creating a magnetic field which passes through a portion of the stationary element and has a lifting effect on the truck, and means for automatically regulating the extent of the lifting effect comprising a regulator for regulating the effective strength of said magnetic field, electrically operated means for actuating said regulator, and means comprising a movable device carried by the truck for automatically controlling said electrically operated means.

7. In combination, a truck and a stationary element, and means partly on the truck and partly along the stationary element arranged to constitute a solenoid winding.

8. In a traction system, a stationary element and truck adapted to move along the stationary element, a solenoid coil carried partly by the truck and partly by the stationary element, the truck having brushes which coöperate with the part carried by the stationary element to complete the solenoid circuit.

9. In combination, a truck, a stationary element along which the truck is adapted to move, means comprising a plurality of conductors carried by the stationary element and a plurality of conductors carried by the truck arranged to constitute a solenoid winding, one end of that portion of the solenoid winding carried by the stationary element being displaced lengthwise of the stationary element relative to the corresponding end of the portion carried by the truck, whereby the two portions of the winding are magnetically unbalanced.

In testimony whereof, I hereunto affix my signature in the presence of two witnesses.

TOM L. JOHNSON.

Witnesses:
H. R. SULLIVAN,
W. A. CAREY.